United States Patent [19]
Baebel

[11] Patent Number: 5,378,203
[45] Date of Patent: Jan. 3, 1995

[54] MECHANICAL DONUT AND ASSEMBLY

[75] Inventor: Ronald G. Baebel, Dallas, Tex.

[73] Assignee: Ultra Polymer Sciences, Inc., Dallas, Tex.

[21] Appl. No.: 680,243

[22] Filed: Apr. 2, 1991

[51] Int. Cl.6 .............................................. F16H 55/12
[52] U.S. Cl. ..................................... 474/96; 474/902; 198/835; 198/842
[58] Field of Search ............... 474/95, 190, 199, 902, 474/96, 903; 198/836.1, 836.2, 836.4, 842, 843, 781, 835; 74/450

[56] References Cited

U.S. PATENT DOCUMENTS

| | | | |
|---|---|---|---|
| 276,230 | 4/1883 | Dodge | 474/95 |
| 391,180 | 10/1888 | Moomy | 474/96 |
| 458,635 | 9/1891 | Medart | 474/95 |
| 569,663 | 10/1896 | Perkins | 474/95 |
| 1,189,611 | 7/1916 | Morse | 198/814 |
| 1,648,626 | 11/1927 | Smith | 198/842 |
| 1,758,280 | 5/1930 | Evans | 198/780 |
| 1,759,220 | 5/1930 | Brown | 198/780 |
| 2,828,854 | 4/1958 | Cibula | 474/96 X |
| 2,860,766 | 11/1958 | Welter | 193/37 |
| 3,052,395 | 9/1962 | Scott | 226/190 |
| 3,097,737 | 7/1963 | Goodman et al. | 198/192 |
| 3,124,238 | 3/1964 | Tyler | 198/192 |
| 3,198,317 | 8/1965 | Robins | 198/192 |
| 3,199,663 | 8/1965 | Baechli | 198/192 |
| 3,964,658 | 6/1976 | Edwards | 226/190 |
| 3,988,045 | 10/1976 | Coutant | 198/780 X |
| 4,371,362 | 2/1983 | Dorris | 474/902 X |
| 4,402,390 | 9/1983 | Feeney | 474/96 X |
| 4,445,257 | 5/1984 | Delhaes | 29/117 |
| 4,506,559 | 3/1985 | Francke et al. | 74/450 X |
| 4,573,563 | 3/1986 | Delhaes | 193/37 |
| 4,631,974 | 12/1986 | Wiegand | 474/152 X |
| 5,057,058 | 10/1991 | Crudup | 474/95 |
| 5,117,970 | 6/1992 | Gibbs | 198/842 |

FOREIGN PATENT DOCUMENTS

| | | | |
|---|---|---|---|
| 164976 | 11/1905 | Germany . | |
| 202371 | 8/1923 | United Kingdom | 474/95 |

*Primary Examiner*—Roger J. Schoeppel
*Attorney, Agent, or Firm*—Harold Levine

[57] ABSTRACT

An improved mechanical donut and donut assembly in which donuts made of plastic materials are formed in segments that facilitate installation, removal and/or replacement for manufacture and maintenance. The donuts of the preferred embodiments are made of urethanes, especially polyurethane, while fastening members such as threaded bolts are made of nylon. The relative characteristics of the urethanes and nylon are such as to facilitate a self-tapping feature for the nylon bolt.

9 Claims, 2 Drawing Sheets

MECHANICAL DONUT AND ASSEMBLY

This invention relates to improved mechanical donuts and more particularly to mechanical donuts that are specially adapted for ready replacement and maintenance.

BACKGROUND OF THE INVENTION

It is well known that there are many applications for mechanical donuts. Thus, for example, one particularly useful application is as rotatable supports for supporting conveyor belts in mining and aggregate handling. Typically, such a conveyor belt is "endless" and on its upper surface conducts the conveyed material from one position to another. Spaced apart longitudinally along the major axis of the conveyor are rotatable members such as axles positioned at right angles to such major axis and on each of which there are affixed a plurality of donut-like members that are spaced longitudinally along the axis of each such axle. When the belt is in motion, it rides on the donuts which, with the axles, rotate so as to support the belt while introducing a minimum of friction to impede its movement.

Many mined materials such as fossil fuels and mineral ores are notoriously abrasive. While the surface of the endless belt tends to sustain the major part of the abrasion since it directly contacts the conveyed materials, abrasive dust from the materials and other sources nevertheless tends to abrade the working surfaces of the donuts that are in contact with the underside of the belts. Accordingly, it has been necessary regularly to replace the donuts and/or assemblies of axles and donuts that are mounted thereon.

Typically, when donuts become worn, an entire assembly consisting of axle and donuts is replaced. In representative installations, this requires from two to six men one to three hours to remove an old axle assembly (often referred to as an idler) and replace it with a new one. Moreover, such replacement often must be made under hazardous conditions such as those in which men must be suspended high in the air to gain access to the assemblies which often are positioned at highly elevated locations such as from 30 to 100 feet above ground level. In addition, temporary support must be supplied for an otherwise supported section of the conveyor belt. Since typically, roller axles (idlers) are spaced 10 or more feet apart, a substantial length of temporarily unsupported belt must be temporarily supported while the axle is being replaced. Accordingly, serious problems occur when practicing currently practiced procedures.

Not only are there time-consuming and dangerous aspects of the currently practiced procedures for maintaining belts as described above, but once the axle with its donuts (idler) is removed, it usually is scrapped. While some idlers can be repaired, such repairs are time-consuming and costly. Thus, the common procedure for such repair involves the utilization of a hydraulic press to press off from the supporting axle the worn donuts. The axle must then be cleaned and prepared for the mounting of new donuts and the donuts must be pressed into place along the axis of the idler. Subsequently, the repaired idler must be installed in place of an existing idler when the latter requires replacement. In most situations, it has been found to be more expensive to repair a used idler than to purchase a new one.

In view of the foregoing, there has continued to be a need for a way to provide routine maintenance and replacement of worn idler parts easily and without having to replace an entire axle assembly.

BRIEF SUMMARY OF THE INVENTION

The improvements according to the invention, include improved donuts and assemblies comprised of axles and segmented donuts wherein the segments of the donuts are constructed in accordance with the principles of the invention so as to facilitate individual donut removal and replacement in situ without having to remove an entire axle/donut assembly. By utilizing combinations of donut and fastener materials that have been found to embody particularly efficacious characteristics, and by observing predetermined geometric principles in the construction of segments of the donuts, the removal and replacement of donuts is substantially simplified and the life expectancy of axle/donut assemblies is substantially extended.

OBJECTS AND FEATURES OF THE INVENTION

It is one general object of the invention to improve mechanical donuts.

It is another object of this invention to improve assemblies of mechanical donuts and supporting axles.

It is yet another object of this invention to facilitate maintenance and replacement of worn mechanical donuts and supporting axles.

It is still another object of the invention to reduce maintenance costs of mechanical equipment utilizing mechanical donuts and supporting axles.

It is yet another object of the invention to facilitate ease of replacement and to increase safety in maintenance of mechanical donuts and supporting axles.

Accordingly, in accordance with one feature of the invention, a multi-element donut is provided so as to permit mounting and removal from a supporting shaft without the requirement for press fitting, thus facilitating installation and removal.

In accordance with yet another feature of the invention, a recess is provided in a predetermined part of at least one segment of the multi-element donut for accepting an adjustable fastening member thus facilitating the securing and removing of the donut from its supporting shaft.

In accordance with another feature of the invention, according to a preferred embodiment, two complementary sections are provided to form each donut, thus contributing to ease of installation and removal.

In accordance with yet another feature of the invention, the two complementary sections may be made identical to each other, thus reducing the number of parts required, facilitating manufacture, stocking and installation.

In accordance with another feature of the invention, in an alternate-embodiment a hinge is provided to secure one set of abutting surfaces, thus contributing to flexibility in installation and removal.

In accordance with still another feature of the invention, one or more sets of donut segment abutting surfaces are tapered with a predetermined degree of taper so as to facilitate snugging up of the sectors of a donut on its supporting axle when tightening members are tightened and the donut is slightly deformed so as to bring the tapered surfaces into full contact.

In accordance with still another feature of the invention, where the principles of the invention are practiced with an axle having a circular cross section, the inner geometry of the inner surfaces of the donut are made to be slightly non-circular before installation by an amount related to the aforementioned tapered abutting surfaces so that when the tapered abutting surfaces are brought into full engagement, the aforementioned inner geometry of the inner surfaces of the donut are correspondingly deformed to form it around the circular cross section of the axle.

In accordance with yet another feature of the invention, the material from which the donut sectors are made is urethane and the aforementioned adjustable fastening member is made of nylon, the respective qualities of urethane and nylon having been discovered to relate to each other in a way that facilitates the utilization of the fastening member in a self tapping and vibration resistant mode thus contributing to ease of fastening, unfastening and invulnerability to unintentional loosening from vibration.

In accordance with one additional feature of the invention, through the combined interaction of materials and geometries, the donuts are made entirely free of metal, thus eliminating one factor potentially hazardous to associated components such as endless belts.

These and other objects and features of the invention will become apparent from the following detailed description, by way of preferred examples, with reference to the drawings.

DESCRIPTION OF A PREFERRED EMBODIMENT

Figure 1:
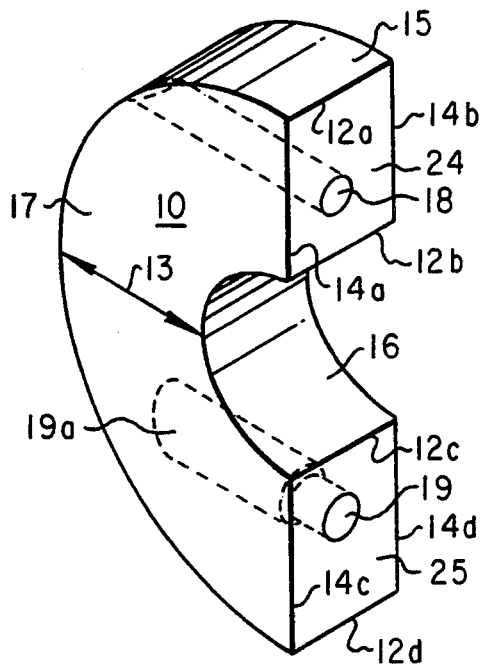
FIG. 1 is a perspective view of a donut segment constructed in accordance with one preferred embodiment of the invention.

Now turning to the drawing, and more particularly FIG. 1 thereof, it will be observed that it depicts one half 10 of a two-half donut 11 (FIG. 2) constructed in accordance with the principles of the invention. The half 10 is seen to include a width represented by lines 12a–12d, a semicylindrical sector thickness represented by dimensioning arrow 13 and lines 14a–14d, an exterior semicircular surface 15, and an interior curved surface 16.

Extending completely through the wall 17 of each donut half 10 are fastening apertures 18 and 19 of which both preferably are unthreaded, although one may be completely or partially threaded and the other unthreaded. As will be further observed, and is shown more clearly in FIG. 2, aperture 19 is fitted with a region 19a of expanded diameter so as to be adapted for receiving the head 20 (FIG. 5) of a fastening member 21.

Figure 5:
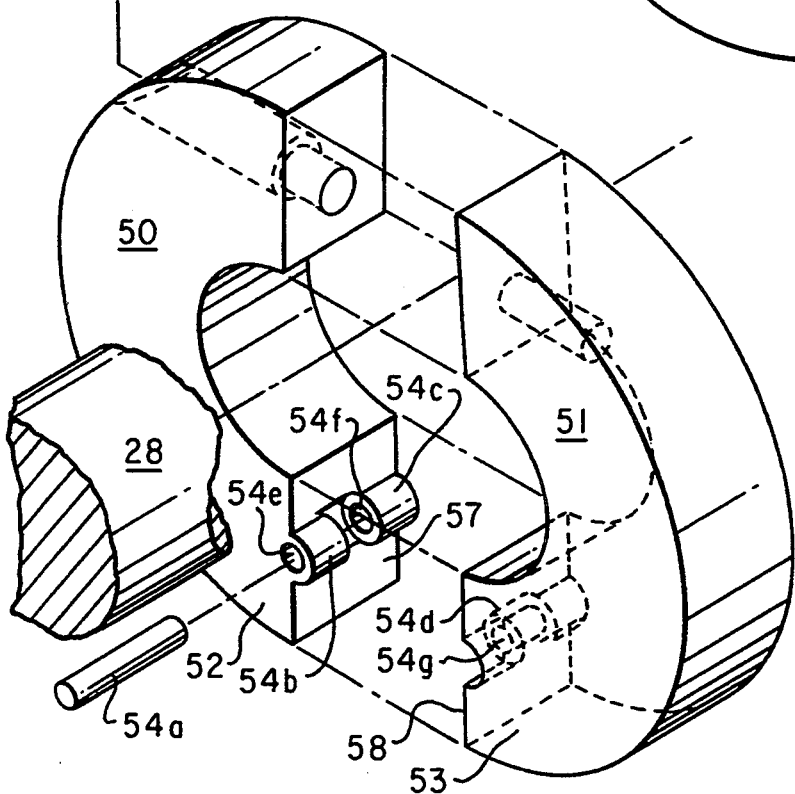
FIG. 5 is an exploded view of an alternate embodiment of the invention in which two abutting surfaces are joined by a hinge mechanism.

Fastening member 21 preferably includes a conventional recess 22 (FIG. 6) in the head thereof for receiving an Allen Head tightening tool or the like (not shown) so as to provide for ready torquing of the member to fasten the donut around a support such as axle 28 (FIG. 5). It also preferably includes a smooth unthreaded shank portion 23 which extends along its length sufficiently so as to prevent threaded engagement with the interior of aperture 19. As will be evident to one skilled in the art, the threaded portion 23a extends sufficiently and is tapered sufficiently so as preferably to make self-tapping threaded engagement with the aperture in the opposing donut half that corresponds to recess 18 in FIG. 1, e.g., aperture 18a in FIG. 2. It should be noted, however that the interior of apertures 18 and 18a could be wholly or partially threaded.

As mentioned above, one of the features of the invention resides in the advantageous relationship of the qualities of materials from which the main body of the donut and the fastening members are made. Thus, it has been found that nylon is harder than urethanes and consequently that the threads of a fastening member 21 made of nylon will satisfactorily cut into the unthreaded or partially threaded interior surfaces of recesses such as recesses 18 and 18a. Moreover, it has been discovered that when tension is applied to the mating segment of the donut by the tightening of the fastening member 21, the corresponding tension on the threads of the fastening member and the engaging inner surfaces of the recess are such as to impart a highly vibration resistant quality to prevent disengagement or loosening of the fastening member and consequent unintentional disassembly of the donut even under otherwise troublesome conditions.

In addition to the foregoing, it has been discovered that urethanes and in particular, polyurethanes, provide other superior characteristics. Thus, the urethanes are particularly well adapted for use in abrasive environments such as those often encountered in minerals and aggregate handling installations.

It should be noted that although the preferred embodiment contemplates the mounting of the donuts on a cylindrical shaft or axle, such as axle 28 of FIG. 5, certain of the principles of the invention are also adaptable to use with non cylindrical shafts. Thus, for example, it should be understood that interior surfaces corresponding to the interior surface 16 (FIG. 1) could describe a different geometry such as that of a square, rectangle or the like.

Figure 2:
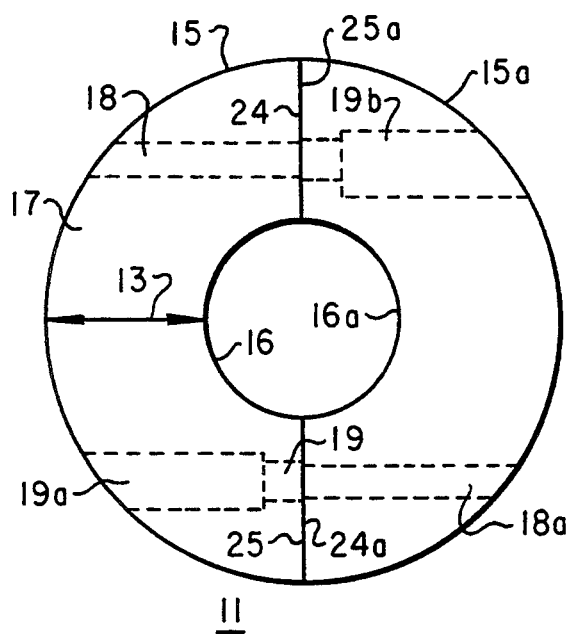
FIG. 2 is a side elevation view depicting a completed donut with two halves of FIG. 1 in abutting contact.

Additional reference to FIGS. 1 and 2 reveals that when two identical segments such as that depicted in FIG. 1 are assembled together as depicted in FIG. 2, they conveniently form a completed donut 11. To assist in visualizing such assembly, it may be helpful to consider a second segment identical to that of segment 10 as being turned upside down so that its aperture 19b is axially aligned with communicating aperture 18, and so that aperture 19 is axially aligned with communicating aperture 18a. Thus another of the features of the invention is achieved, namely that in a preferred embodiment of the invention, all segments of the donut can be made identical, thus contributing to simplicity and expense reduction.

Further reference to FIGS. 1 and 2 reveals that facing and engagement surfaces 24, 25, 24a and 25a lie in the same plane when the donut of FIGS. 1 and 2 is assembled. Moreover, surfaces 24 and 25 lie in the same plane, and surfaces 24a and 25a lie in the same plane when the donut is disassembled. This is in contrast with the geometries of corresponding surfaces in another preferred embodiment as depicted in FIGS. 3 and 4 and as described below.

Figure 4:
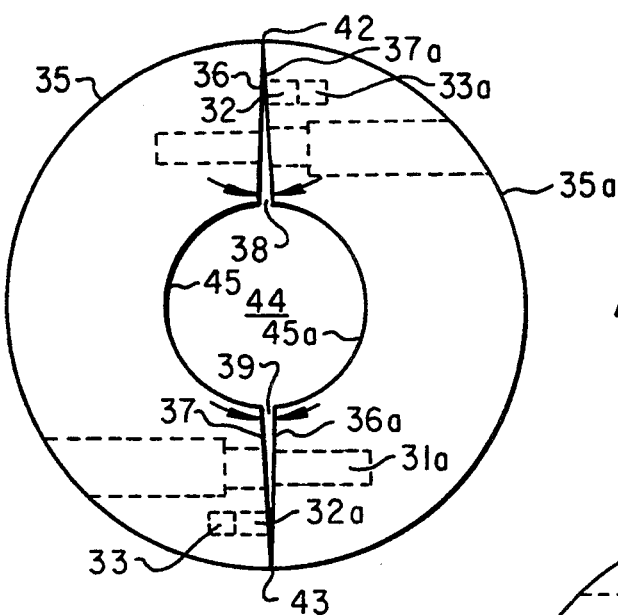
FIG. 4 is a side elevation view similar to that of FIG. 2 except illustrating the adjoining of two donut segments having tapered face surfaces as illustrated in FIG. 3.

Finally, it should be noted that although in the embodiment of FIGS. 1 and 2, the apertures identified by symbols 18, 19, 18a and 19b extend completely through the donut 11, thereby exposing both ends to the exterior, it is contemplated that in certain applications and environments it would be preferable to extend apertures such as those defined by symbols 18 and 18a only partly through the material and have their ends terminate within the donut segment as is depicted in FIG. 4.

Figure 3:
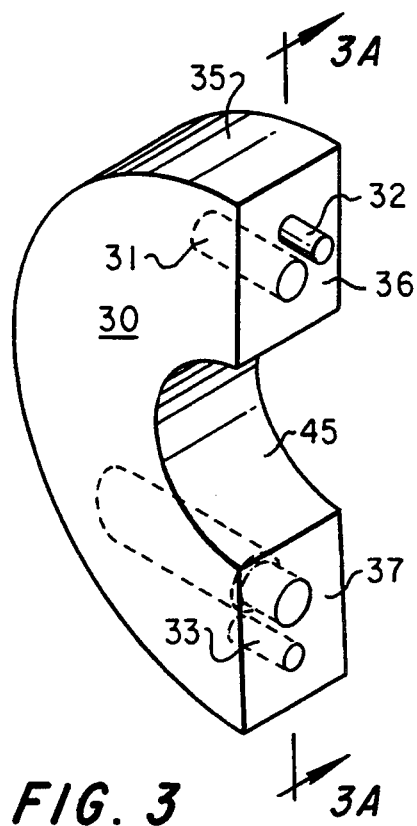
FIG. 3 is a perspective view illustrating a donut segment having adjoining facing surfaces that are tapered.
Figure 3A:
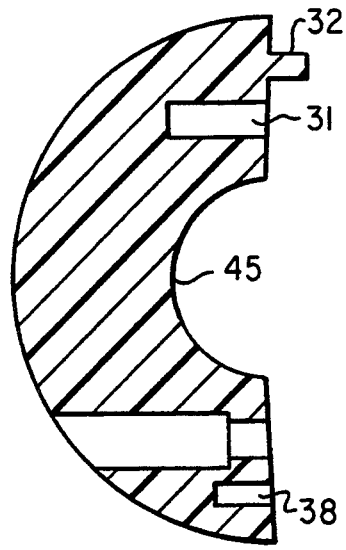
FIG. 3a is a section taken along the section lines 3a—3a of FIG. 3.

Now turning to FIG. 3, it will be observed that it depicts a donut half 30 which corresponds to the donut half 10 of FIG. 1. However, there are three major differences between the embodiment of FIGS. 1 and 2 and the embodiment of FIGS. 3 and 4. The first of these is that instead of the apertures 18 and 18a which extend entirely through the donut segments in FIGS. 1 and 2, recesses 31 and 31a which do not extend entirely through the material are provided in FIGS. 3 and 4. By having recesses 31 and 31a terminate within the body of the donut segments, less non-uniformity is imparted to the curved exterior surfaces 35 and 35a (corresponding to surfaces 15 and 15a of FIGS. 1 and 2. In other words, only two apertures are formed in the exterior surfaces of the donut of FIG. 4 instead of the four apertures in the exterior surfaces 15 and 15a of FIG. 2.

As mentioned above, another of the features of the invention resides in the alternative provision of tapers to the surfaces in FIGS. 3 and 4 that correspond to surfaces 24, 24a, 25 and 25a of FIGS. 1 and 2. Thus, in FIGS. 3 and 4, the corresponding surfaces 36, 36a, 37 and 37a are seen to be slightly non parallel by an amount preferably lying in the range of from 1 to 3 degrees. This is represented by the tapered geometries that can be clearly observed in FIG. 4 and that are represented by the dimensions of arcs 38 and 39 that are shown as exaggerated for sake of visual clarity. As will be further observed, when the donut halves of FIG. 4 are in position as shown but not tightened, the outer edges along lines described by symbols 42 and 43 only are in contact. However, when the fastening members are tightened, the donuts are stressed so as to bring pairs of opposing faces 36/37a and 37/36a into engagement while at the same time, the geometrical shape of the interior aperture 44 is altered slightly.

The third of the major differences lies in the provision of a protruding guide dowel or nipple 32 which mates with recess 33a located in the other half of the completed donut. Corresponding guide dowels or nipples may be added to the embodiment of FIGS. 1 and 2 if desired, as they have been found to provide an attractive feature in situations where donuts are to be installed on supporting shafts in precarious locations. Thus, the size of the member 32 and its mating recess 33a, and the size of the member 32a and its mating recess 33 are made so that the dowel member (32/32a) fits sufficiently snugly into the recess (33/33a) as to be retained therein by frictional engagement unless a significant force is imparted to disengage them. Accordingly, when two halves of a donut are being installed, they may be pressed into engagement, and the friction between the dowels and their mating recesses will hold the donut halves in position until the fastening bolts or other members are tightened.

It has been found that for the embodiment of FIGS. 3 and 4, it is preferable that the interior surfaces 45 and 45a (corresponding to interior surfaces 16 and 16a of FIGS. 1 and 2) be slightly out of round by a amount substantially corresponding to the degree to which the unstressed surfaces 36, 37a, 37 and 36a deviate from the parallel planar. This has been found to facilitate tightening of the grip of such normally out of round surfaces around the exterior cylindrical surface of a supporting cylindrical shaft such as that of axle 28 in FIG. 5.

Figure 6:
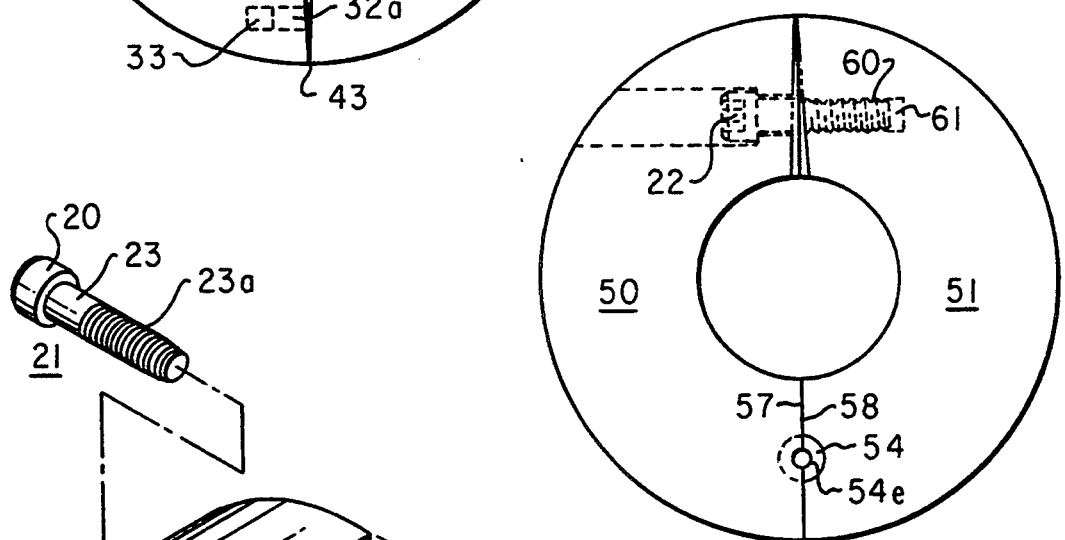
FIG. 6 is a side elevation view depicting a completed donut formed in accordance with FIG. 5.

Now turning to FIGS. 5 and 6, it will be observed that they depict an alternative embodiment embodying selected ones of the principles of the invention as described in connection with FIGS. 1–4. There, in FIGS. 5 and 6 are depicted donut halves 50 and 51 which generally correspond to the donut halves of the earlier figures. However, in contrast with the earlier embodiments, the embodiment of FIGS. 5 and 6 includes but one fastening member 21 and instead of the remaining fastening member, provides for engagement of the lower portions 52 and 53 through the utilization of a hinge assembly 54 which comprises a hinge pin 54a, a plurality of hinge segments as represented by segments 54b and 54c that are adapted for mating with one or more mating segments as represented by segment 54d (shown in phantom). The hinge 54 may include circular apertures 54e–54g adapted for alignment (as shown), or the apertures may be slightly out of round so as to allow for slight installation adjustment. Moreover, the apertures 54e–54g may be intentionally made to be eccentric so that, together with a correspondingly eccentric pin corresponding to hinge pin 54a, an angular rotation and locking of the pin can provide a snugging up of the adjoining faces 57 and 58. In addition, the pin 54a may be made to be in the shape of a slightly truncated cone, and the interior apertures 54e–54g may be made correspondingly shaped so that locking of the hinge elements by driving the pin longitudinally into place additionally tightens the elements of the hinge.

The remainder of the upper part of the embodiment of FIGS. 5 and 6 is similar to the upper part of the embodiment of FIGS. 3 and 4, with the upper portion of the donut being secured by fastening member 20 through engagement of the threaded portion 23a of fastening member 20 with the interior surface 60 of recess 61. However, in order to accomodate the hinge arrangement, the remainder of the lower portion of the embodiment of FIGS. 5 and 6 is similar to the corresponding part of the embodiment of FIGS. 1 and 2.

Although the invention hereof has been described by way of example of preferred embodiments, it will be evident that other adaptations and modifications can be employed without departing from the spirit and scope thereof. For example, twin side-by-side donuts each embodying the above-described principles and geometries of the invention could be provided. In addition, donuts as described herein could be attractive for and readily to other employments such as cams or idlers for other applications.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A mechanical donut having a plurality of segments forming said donut, each of said segments being made of a material selected from the class consisting of urethanes and polyurethanes, two of said segments including recesses therein adapted for receiving a threaded nylon fastening member, and in which two of said recesses extend to external working surfaces of said mechanical donut in different segments when said segments are assembled together.

2. A mechanical donut according to claim 1 in which said donut includes a single continuous oval-shaped aperture in the center thereof.

3. A mechanical donut according to claim 1 in which abutting faces of said segments are tapered according to a predetermined degree of tapering whereby when said segments are not tightened together, said abutting faces of said segments touch only along one edge thereof and, when said segments are tightened together, said segments deform to bring said abutting faces of said segments into continuous contact.

4. A mechanical donut according to claim 2 in which abutting faces of said segments are tapered according to a predetermined degree of tapering whereby when said segments are not tightened together, said abutting faces of said segments touch only along one edge thereof and, when said segments are tightened together, said segments deform to bring said abutting faces of said segments into continuous contact.

5. A mechanical donut according to claim 2 in which abutting faces of said segments are tapered according to a predetermined degree of tapering whereby when said segments are not tightened together, said abutting faces of said segments touch only along one edge thereof and said single aperture is entirely oval-shaped and, when said segments are tightened together, said segments deform to bring said abutting faces of said segments into continuous contact and said oval-shaped aperture becomes essentially circular.

6. A mechanical donut according to claim 1 further including two other recesses residing within said segments, said two other recesses being accessible only from inner surfaces of said donut.

7. A mechanical donut according to claim 6 in which said recesses are disposed in axially aligned pairs when said segments are assembled to form said donut.

8. A mechanical donut assembly having a plurality of segments forming said donut, each of said segments being made of a material selected from the class consisting of urethanes and polyurethanes, in which two of said segments include recesses therein adapted for receiving a threaded nylon fastening member, and in which said threaded nylon fastening member is a nylon bolt.

9. A mechanical donut comprising two identical 180 degree arc segments of plastic and a pair of nylon threaded fastening members for fastening together said segments to form said donut, each of said segments having:

a. an exterior semi-circular exterior working surface and an interior surface of predetermined geometrical shape to form fit about a selected axle;

b. two end surfaces essentially lying in a plane passing through the center of said donut;

c. an aperture extending from a predetermined location on said exterior circular surface of a first dimension having a reduced dimension extending through the material of said segment and exiting through a predetermined position on one of said two end surfaces; and d. a recess of cross sectional dimension corresponding to the reduced cross sectional dimension of said aperture and located on the other of said two end surfaces in a position corresponding to said predetermined position on said one of said two end surfaces;

whereby, when said two identical 180 degree arc segments are assembled together to form said mechanical donut, said recess in each of said segments is in axial alignment with said aperture in the other of said segments.

* * * * *